(12) United States Patent  
Habib et al.

(10) Patent No.: US 7,882,455 B2
(45) Date of Patent: Feb. 1, 2011

(54) CIRCUIT AND METHOD USING DISTRIBUTED PHASE CHANGE ELEMENTS FOR ACROSS-CHIP TEMPERATURE PROFILING

(75) Inventors: Nazmul Habib, South Burlington, VT (US); Mark C. H. Lamorey, South Burlington, VT (US); Thomas M. Maffitt, Burlington, VT (US); Robert McMahon, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/117,784

(22) Filed: May 9, 2008

(65) Prior Publication Data

US 2009/0282375 A1 Nov. 12, 2009

(51) Int. Cl.
*G06F 17/50* (2006.01)
(52) U.S. Cl. .................. 716/1; 365/163; 257/2
(58) Field of Classification Search ........... 716/1; 365/163; 257/2
See application file for complete search history.

(56) References Cited

U.S. PATENT DOCUMENTS

| | | | |
|---|---|---|---|
| 5,772,328 A | 6/1998 | Kronberg | |
| 6,567,296 B1 * | 5/2003 | Casagrande et al. | 365/105 |
| 6,885,602 B2 | 4/2005 | Cho et al. | |
| 6,937,507 B2 * | 8/2005 | Chen | 365/163 |
| 7,020,014 B2 | 3/2006 | Khouri et al. | |
| 7,123,995 B1 | 10/2006 | Desai et al. | |
| 7,349,245 B2 * | 3/2008 | Kim et al. | 365/158 |
| 7,548,451 B2 * | 6/2009 | Oh et al. | 365/163 |
| 7,570,524 B2 * | 8/2009 | Bedeschi et al. | 365/189.06 |
| 7,679,950 B2 * | 3/2010 | Philipp et al. | 365/163 |
| 2004/0151023 A1 | 8/2004 | Khouri et al. | |
| 2005/0122771 A1 * | 6/2005 | Chen | 365/163 |
| 2005/0265898 A1 | 12/2005 | Bell et al. | |
| 2007/0009687 A1 | 1/2007 | Edwards et al. | |
| 2007/0045771 A1 * | 3/2007 | Philipp et al. | 257/528 |
| 2007/0047160 A1 * | 3/2007 | Philipp et al. | 361/18 |
| 2009/0001336 A1 * | 1/2009 | Habib et al. | 257/2 |
| 2009/0129195 A1 * | 5/2009 | De Brosse et al. | 365/230.06 |
| 2009/0161421 A1 * | 6/2009 | Cho et al. | 365/163 |
| 2009/0237984 A1 * | 9/2009 | Porter | 365/163 |

* cited by examiner

*Primary Examiner*—Naum B Levin
(74) *Attorney, Agent, or Firm*—Gibb I.P. Law Firm, LLC; Michael J. LeStrange, Esq.

(57) ABSTRACT

Disclosed is an across-chip temperature sensing circuit and an associated method that can be used to profile the across-chip temperature gradient. The embodiments incorporate a plurality of phase change elements distributed approximately evenly across the semiconductor chip. These phase change elements are programmed to have essentially the same amorphous resistance. Temperature-dependent behavior exhibited by each of the phase change elements individually is compared to a reference (e.g., generated by a discrete reference phase change element, generated by another one of the phase change elements, or generated by an external reference) in order to profile the temperature gradient across the semiconductor chip. Once profiled, this temperature gradient can be used to redesign and/or relocate functional cores, to set stress limits for qualification of functional cores and/or to adjust operating specifications of functional cores.

19 Claims, 5 Drawing Sheets

CIRCUIT AND METHOD USING DISTRIBUTED PHASE CHANGE ELEMENTS FOR ACROSS-CHIP TEMPERATURE PROFILING

BACKGROUND

1. Field of the Invention

The embodiments of the invention generally relate to across-chip temperature profiling and, more particularly, to a circuit and a method that use distributed phase change memory (PCM) elements for across-chip temperature profiling.

2. Description of the Related Art

Operational performance of integrated circuit devices can be significantly affected by temperature variations, due to temperature-dependent characteristics, such as charge carrier mobility, threshold voltage, resistance, etc. Consequently, the temperature gradient across a semiconductor chip can be profiled to set up the needed stress levels for testing and qualification of system-on-chip (SOC) functional cores (e.g., third party intellectual property (IP) cores, logic cores, memory cores, processor cores, etc.) and further to set operational specifications (e.g., operating voltages) for SOC functional cores.

On-chip temperature sensors are useful tools for profiling temperature gradients. However, as integrated circuits continue to be scaled in size, the use of conventional analog temperature sensors can result in significant area penalties. Additionally, such temperatures sensors often operate at relatively high operating voltages making their integration into current state of the art technologies, with relatively low operating voltages, more difficult. Therefore, there is a need in the art for an improved temperature gradient profiling technique that can be easily integrated into new state of the art technologies.

SUMMARY

In view of the foregoing, disclosed herein are embodiments of an across-chip temperature sensing circuit and an associated method that can be used to profile the across-chip temperature gradient. The embodiments incorporate a plurality of phase change elements distributed approximately evenly across the semiconductor chip. These phase change elements are programmed to have essentially the same amorphous resistance. Temperature-dependent behavior exhibited by each of the phase change elements individually is compared to a reference (e.g., generated by a discrete reference phase change element, generated by another one of the phase change elements, or generated by an external reference) in order to profile the temperature gradient across the semiconductor chip. Once profiled, this temperature gradient can be used to redesign and/or relocate functional cores, to set stress limits for qualification of functional cores and/or to adjust operating specifications of functional cores.

More particularly, one embodiment of an across-chip temperature sensing circuit according to the present invention can comprise a semiconductor chip and a plurality of phase change elements and a comparator circuit on the semiconductor chip. The phase change elements can be distributed approximately evenly across the semiconductor chip and can be programmed to have approximately equal amorphous resistances. Additionally, the total number of phase change elements on the chip can be predetermined based on a predetermined minimize size of any area on the semiconductor chip that could potentially have, during chip operation, a local temperature above a predetermined temperature.

The comparator circuit can comprise a sensing leg, a reference leg and a voltage difference detection device. A first current source is adapted to generate a first current (i.e., a sense current (ISense)) for the sensing leg and a second current source is adapted to generate a second current (i.e., a reference current (IRef)) for the reference leg. An equalizing multiplexer can ensure that the first and second currents are equal.

In the sensing leg, the first current source can be electrically connected to a selected phase change element through a switching circuit. In the reference leg, the second current source can be electrically connected to a reference phase change element that is different from the selected phase change element being sensed. For example, the reference phase change element can comprise a second selected phase change element that is electrically connected to the second current source through a second switching circuit. Alternatively, the reference phase change element can comprise a phase change element that is permanently designated as "the reference phase change element" and not connected to any switching circuits.

The voltage difference detection device can comprise, for example, a sense amplifier with two inputs. A first input can be electrically connected to a first node between the first current source and the selected phase change element. A second input can be electrically connected to a second node between the second current source and the reference phase change element. The voltage difference detection device can adapted to compare a first voltage at the first input and a second voltage at the second input, when the first and second currents (ISense and IRef) are applied to the sensing and reference legs, respectfully. During chip operation, different voltages at the sense amplifier inputs are indicative of different resistances in selected phase change element being sensed and the reference phase change element and, thereby indicative of variations in local temperatures, during chip operation.

It should be noted that in order for the comparator circuit to function, as described, additional features may be required to eliminate or at least compensate for non-temperature related variations in voltages measured at the inputs to the sense amplifier. Such non-temperature related voltage differences can be caused by differences in amorphous resistances between the reference phase change element and the selected phase change element, due to process variations. Such non-temperature related voltage differences can also be caused by differences in parasitic wiring resistances, due to relative distances of the reference phase change element and the selected phase change element from the voltage difference detection device. Specifically, in order to compensate for these non-temperature related voltage differences, the comparator circuit can further comprise a third current source adapted to generate a third current (i.e., a sense leg bias current (ISense Bias)). This third current source can be electrically connected to a third node between the first node and the switching circuit in order to adjust the amorphous resistance of the selected phase change element to below a predetermined level. Additionally, in the case where the reference phase change element is a different selected one of the distributed phase change elements (as opposed to a permanently designated phase change element), a fourth current source can be electrically connected to a fourth node between the second node and the second switching current. This fourth current source can similarly generate a fourth current (i.e., a reference leg bias current (IRef Bias)) in order to adjust the amorphous resistance of the selected reference phase change element to below the predetermined level. Yet another technique used to avoid voltage differences at the input nodes of the sense amplifier (e.g., in the case where the reference phase change element is not permanently designated) is to ensure that the two switching circuits are adapted to select the phase change elements for sensing and reference from the same region of the semiconductor chip, thereby minimizing or avoiding all together differences in parasitic wiring resistances.

Another embodiment of an across-chip temperature sensing circuit according to the present invention uses an external reference as opposed to a reference phase change element. Specifically, this embodiment comprises a semiconductor chip and a plurality of phase change elements and a comparator circuit on the semiconductor chip. The phase change elements can be distributed approximately evenly across the semiconductor chip and can be programmed to have approximately equal amorphous resistances. Additionally, the total number of phase change elements on the chip can be predetermined based on a predetermined minimize size of any area on the semiconductor chip that could potentially have, during chip operation, a local temperature above a predetermined temperature.

The comparator circuit can comprise a sensing leg, a reference leg and a voltage difference detection device. A first current source is adapted to generate a first current (i.e., a sense current (ISense)) for the sensing leg and a second current source is adapted to generate a second current (i.e., a first reference current (IRef1)) for the reference leg. An equalizing multiplexor can ensure that the first and second currents (i.e., ISense and IRef1) are equal.

In the sensing leg, the first current source can be electrically connected to at least one selected phase change element through a switching circuit. However, in the reference leg, the second current source can be electrically connected to an external current source adapted to generate a third current (i.e., a second reference current (IRef2)). This external current source can comprise, for example, a bandgap reference circuit or, alternatively, a voltage to current converter circuit.

The voltage difference detection device can comprise, for example, a sense amplifier with two inputs. A first input can be electrically connected to a first node between the first current source and the selected phase change element. A second input can be electrically connected to a second node between the second current source and the third current source. The voltage difference detection device can adapted to compare a first voltage at the first input and a second voltage at the second input, when the first current (ISense) is applied to the sensing leg 151 and when the second and third currents (IRef1 and IRef2) are applied to the reference leg 152. Different voltages are again indicative of variations in local temperatures, during chip operation.

In this embodiment the third current source can be directly connected to the second node so that a pre-set current can supplied to the comparator circuit. Alternatively, the third current source can be connected to the second node via a current mirror circuit. This current mirror allows for selectable gain (i.e., the value of the third current (IRef2) can be multiplied, for example, by up to 100). This provides the comparator circuit with greater sensing flexibility.

Also disclosed herein are embodiments of an associated method of across-chip temperature profiling. Specifically, the method embodiments can comprise providing a semiconductor chip having a plurality of approximately evenly distributed phase change elements, such as described above. Next, the phase change elements are programmed so that they have the same (i.e., approximately equal) amorphous resistances.

Once the phase change elements are programmed, the temperature-dependent behavior exhibited by each of these phase change elements during chip operation is sensed in order to profile the temperature gradient across the semiconductor chip. This sensing process can be accomplished, for example, using the above-described comparator circuit. Based on this cross-chip temperature gradient profile, areas on the semiconductor chip having local temperatures outside a predetermined range can also be identified based on the cross-chip temperature gradient profile. Once such areas are identified, functional cores in those areas can be redesigned and/or relocated to other areas of the semiconductor chip in order to optimize SOC performance. Additionally, stress limits for testing/qualification of the functional cores can be set. Finally, operating specifications of functional cores in the identified areas can be adjusted in an effort to limit across-chip temperature variations. These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, operational performance of integrated circuit devices can be significantly affected by temperature variations, due to temperature-dependent characteristics, such as charge carrier mobility, threshold voltage, resistance, etc. Consequently, the temperature gradient across a semiconductor chip can be profiled to set up the needed stress levels for testing and qualification of system-on-chip (SOC) functional cores (e.g., third party intellectual property (IP) cores, logic cores, memory cores, processor cores, etc.) and further to set operational specifications (e.g., operating voltages) for SOC functional cores.

On-chip temperature sensors are useful tools for profiling temperature gradients. However, as integrated circuits continue to be scaled in size, the use of conventional analog temperature sensors can result in significant area penalties. Additionally, such temperatures sensors often operate at relatively high operating voltages making their integration into current state of the art technologies, with relatively low operating voltages, more difficult. Therefore, there is a need in the art for an improved temperature gradient profiling technique that can be easily integrated into new state of the art technologies.

Figure 1:
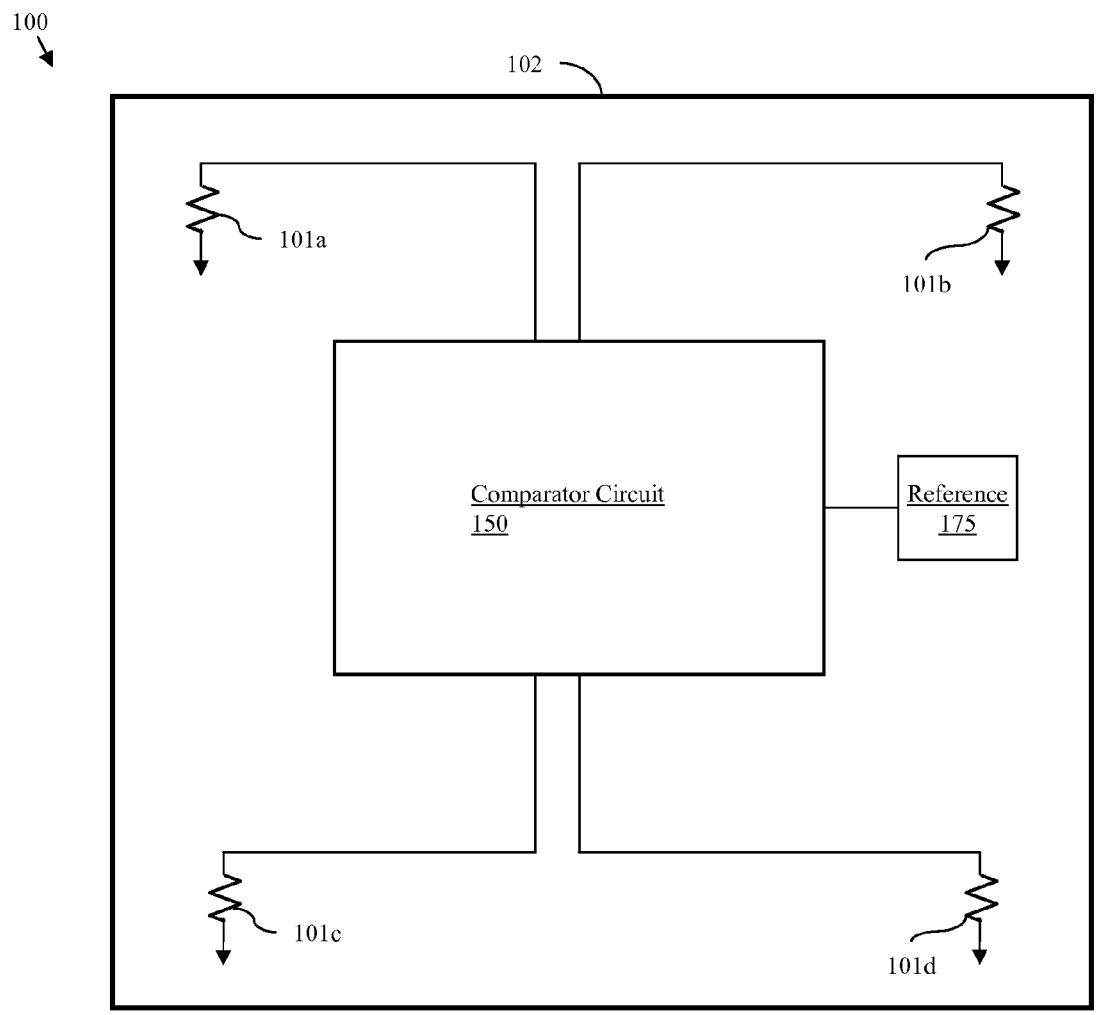
FIG. 1 is a block diagram illustrating generally the across-chip temperature sensing circuit of the present invention.

In view of the foregoing, disclosed herein are embodiments of an across-chip temperature sensing circuit and an associated method that can be used to profile the across-chip temperature gradient. Referring to FIG. 1, the embodiments incorporate a plurality of phase change elements 101a-d distributed approximately evenly across the semiconductor chip 102 (e.g., in a grid pattern). These phase change elements 101a-d are programmed to have essentially the same amorphous resistance. Temperature-dependent behavior exhibited by each of the phase change elements individually is compared (e.g., by comparator circuit 150) to a reference 175 (e.g., generated by a discrete reference phase change element (see FIG. 2), generated by another one of the phase change elements (see FIG. 3), or generated by an external reference (see FIG. 4)) in order to profile the temperature gradient across the semiconductor chip 102 (i.e., to read out what the relative or absolute temperature changes are from one element to another). Once profiled, this temperature gradient can be used to redesign and/or relocate functional cores, to set stress limits for qualification of functional cores and/or to adjust operating specifications of functional cores.

Figure 2:
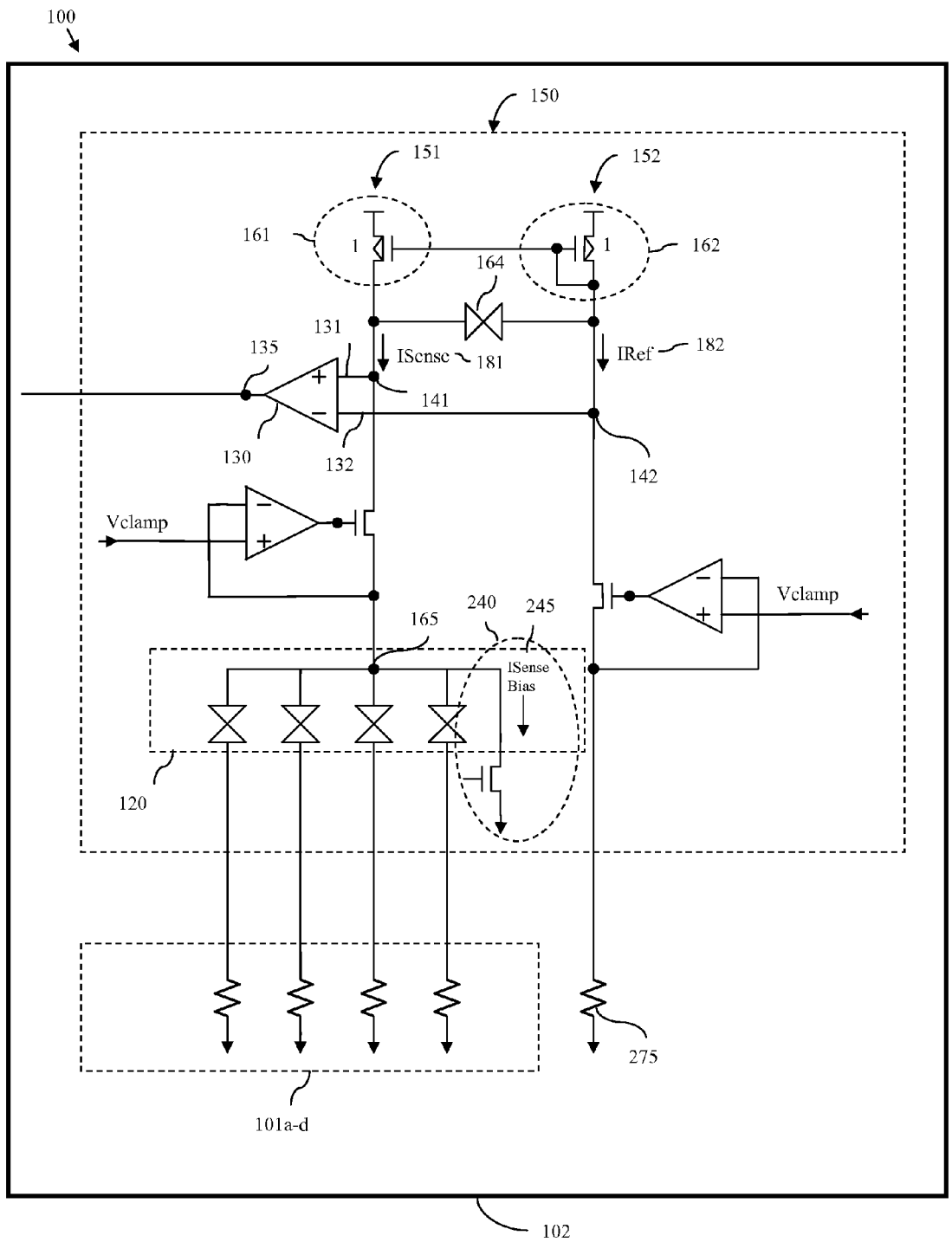
FIG. 2 is a schematic diagram illustrating an embodiment of the across-chip temperature sensing circuit of the present invention.

More particularly, referring to FIGS. 1 and 2, one embodiment of an across-chip temperature sensing circuit 100 according to the present invention can comprise a semiconductor chip 102 and a plurality of phase change elements 101a-d and a comparator circuit 150 on (i.e., embedded in) the semiconductor chip 102. The phase change elements 101a-d can be distributed approximately evenly across the semiconductor chip 102 and can be programmed to have approximately equal amorphous resistances. Additionally, the number of the phase change elements 101-a-d can be predetermined based on a predetermined minimize size of any area on the semiconductor chip 102 that could potentially have, during chip operation, a local temperature above a predetermined temperature (i.e., based on the predetermined minimum size of a potential "hot spot"). Thus, the four adjacent phase change elements 101a-d are shown for illustration purposes only and it should be understood that any number of phase change elements may be distributed across the chip 102.

The comparator circuit 150 can comprise a sensing leg 151, a reference leg 152 and a voltage difference detection device 130. A first current source 161 is adapted to generate a first current 181 (ISense) for the sensing leg 151 and a second current source 162 is adapted to generate a second current 182 (IRef) for the reference leg 152. The current sources 161, 162 can, for example, comprise essentially identical p-type field effect transistors (i.e., p-type field effect transistors formed according to a same design). An equalizing multiplexer 164 can ensure that the first and second currents 181-182 are equal.

In the sensing leg 151, the first current source 161 can be electrically connected to a selected phase change element (i.e., a selected one of 101a-d) through a switching circuit 120. That is, all of the distributed phase change elements 101a-d can be electrically connected to a switching circuit 120. This switching circuit 120 can comprise a set of bit switches each electrically connected between a corresponding phase change element and a node 165. Thus, the switching circuit 120 can be configured to allow any one of the distributed phase change elements 101a-d to be selectively connected to the first current source 161 for sensing.

Figure 3:
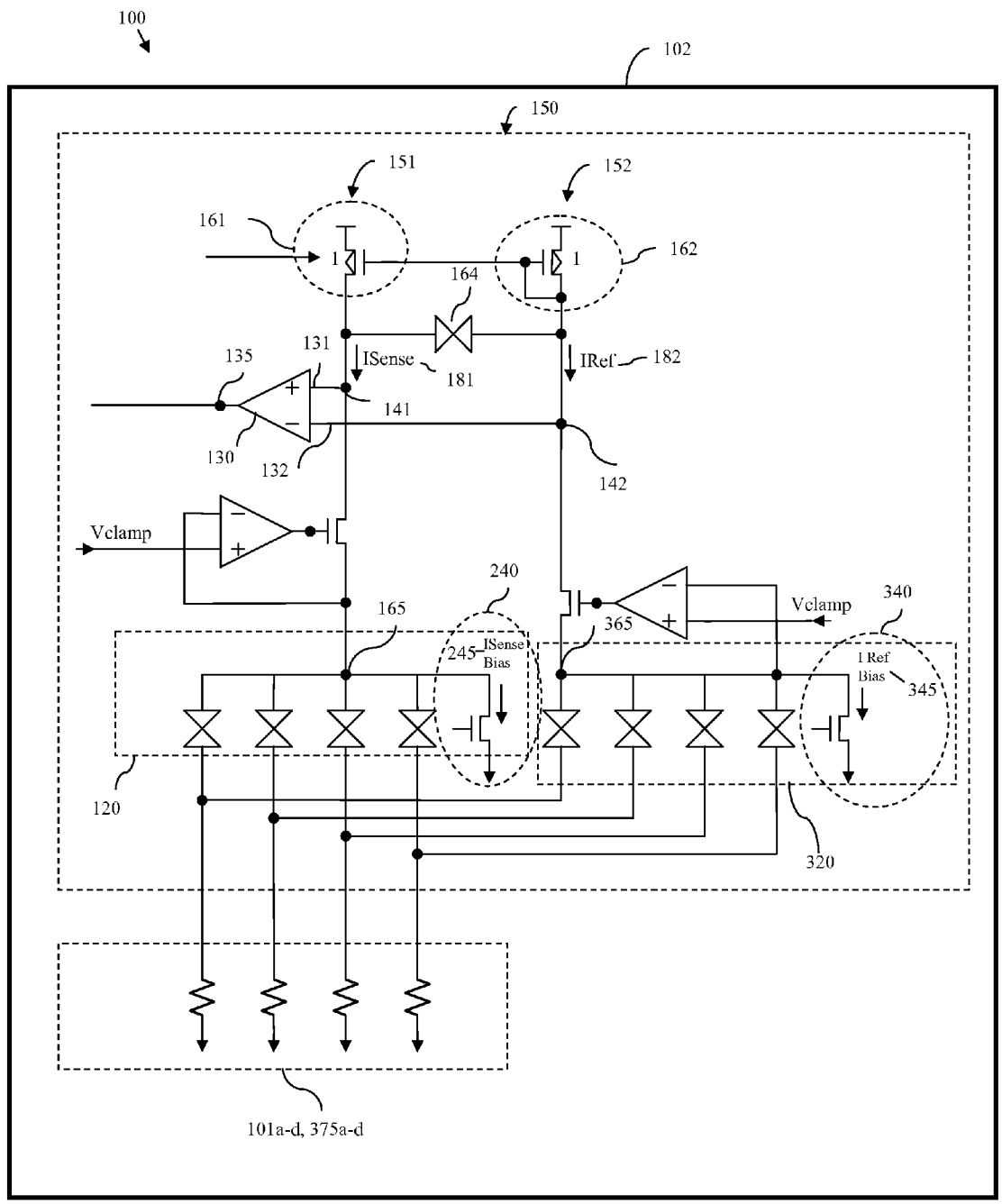
FIG. 3 is a schematic diagram illustrating an alternative configuration for the across-chip temperature sensing circuit of FIG. 2.

In the reference leg 152, the second current source 162 can be electrically connected to a reference phase change element (e.g., 275 in FIG. 2 and 375 in FIG. 3) that is different from the selected phase change element being sensed. For example, as illustrated in FIG. 3, the reference phase change element 375 can be any one of the other distributed phase change elements 101a-d. Specifically, all of the distributed phase change elements 101a-d can also be electrically connected to a second switching circuit 320. This switching circuit 320 can comprise a set of bit switches each electrically connected between a corresponding phase change element and a node 365. Thus, the second switching circuit 320 can be configured to allow any one of these phase change elements 101a-d to be selectively connected to the second current source 162. Consequently, the reference phase change element 375 can comprise a second selected phase change element that is electrically connected to the second current source 162 through a second switching circuit 320. The bit switch control logic should be designed such that the same phase change element can not simultaneously be the selected in the sense leg 151 and reference leg 152.

Alternatively, as illustrated in FIG. 2, the reference phase change element 275 can comprise a phase change element that is permanently designated as "the reference phase change element" and not connected to any switching circuits. This reference phase change element 275 can be placed either relatively near or relatively far away from the comparator circuit 150.

The voltage difference detection device 130 can comprise, for example, a sense amplifier with two inputs 141, 142. A first input 141 can be electrically connected to a first node 131 between the first current source 161 and the selected phase change element (e.g., 101a). A second input 132 can be electrically connected to a second node 142 between the second current source 162 and the reference phase change element (i.e., the permanently designate phase change element 275 of FIG. 2 or the selected reference phase change element 375 of FIG. 3). The voltage difference detection device 130 can adapted to compare a first voltage at the first input 131 and a second voltage at the second input 132, when the first and second currents 181, 182 are applied to the sensing and reference legs 151, 152, respectfully. During chip operation, different voltages at the sense amplifier inputs 131, 132 are indicative of different resistances in selected phase change element and the reference phase change element and, thereby indicative of variations in local temperatures, during chip operation.

Specifically, phase change elements contain phase change materials. These phase change materials can, for example, comprise chalcogenides or alloys thereof, and perovskites or perovskite-like materials (e.g., colossal magnetoresistance (CMR) materials and high temperature superconductivity (HTSC) materials). These phase change materials can switch between stable states, such as an amorphous state or a crystalline state, depending upon the voltage of current passed through them. In their amorphous states, these resistance switching materials exhibit a higher resistance. In their crystalline states, they exhibit a lower resistance. Thus, electrical impulses can be applied to phase change materials in order to "tune" or "program" them such that they exhibit a desired resistive property.

The state of a phase change material and, thus, the resistance is however temperature-dependent. If two phase change elements (e.g., a phase change element being sensed 101a and a reference phase change element 275 or 375) are initially programmed to have a same amorphous resistance and if the same current (i.e., equal sensing and reference currents 181, 182) is passed through these phase change elements, then, absent local temperature variations, the voltages at the inputs 131, 132 to the sense amplifier 130 should be equal. However, if the local temperatures are different, the voltages will be different. For example, if the temperature of the selected phase change element 101a in the sensing leg 151 is higher than the temperature of the reference phase change element 275 or 375 in the reference leg 152, then the resistance of the phase change element 101a in the sensing leg 151 will be lower relative to the resistance of the phase change element 275 or 375 in the reference leg 152. Thus, the voltage at the first input 131 will be lower relative to the voltage at the second input 132.

It should be noted that in order for the comparator circuit 150 to function, as described, additional features may be required to eliminate or at least compensate for non-temperature related variations in voltages measured at the inputs 131, 132 to the sense amplifier 130. Such non-temperature related voltage differences can be caused by differences in amorphous resistances between the reference phase change element (e.g., 275 of FIG. 2 or 375 of FIG. 3) and the selected phase change element (e.g., 101a), due to process variations. Such non-temperature related voltage differences can also be caused by differences in parasitic wiring resistances, due to relative distances of the reference phase change element (e.g., 275 of FIG. 2 or 375 of FIG. 3) and the selected phase change element (e.g., 101a) from the voltage difference detection device 130.

Specifically, in order to compensate for these non-temperature related voltage differences (i.e., to remove and/or null out any positional or process-based resistance variations) an iterative write process can be used during phase change element programming to create a very tight reset resistance. Additionally, the comparator circuit 150 can further comprise a third current source 240 adapted to generate a third current 245 (ISense Bias). This third current source 245 can be electrically connected to a third node 165 between the first node 141 and the switching circuit 120 in order to adjust the initial amorphous resistance (or to adjust a reset amorphous resistance following a reset pulse) of the selected phase change element to below a predetermined level. Additionally, in the case as illustrated in FIG. 3 where the reference phase change element 375 is a different selected one of the distributed phase change elements 101a-d (as opposed to a permanently designated phase change element 275 as illustrated in FIG. 2), a fourth current source 340 can be electrically connected to a fourth node 365 between the second node 142 and the second switching current 320. This fourth current source 340 can similarly generate a fourth current 345 (IRef Bias) in order to alternatively adjust the initial amorphous resistance of the selected reference phase change element 375 (or to adjust the reset amorphous resistance following a reset pulse) to below the predetermined level. That is, a bias current 245 or 345 can be applied to either the sense leg 151 or the reference leg 152 to offset non-temperature related voltage differences (i.e., the offset should be equal to the additional parasitic resistance between the sensed phase change element and the reference phase change element). Consequently, the bias current 245 or, if applicable, the bias current 345 will tighten the resistance distribution of the on-chip phase change elements 101a-d and also null out any positional variations based upon the parasitic wiring resistance.

Yet another technique used to avoid voltage differences at the input nodes of the sense amplifier (e.g., as illustrated in FIG. 3, in the case where the reference phase change element 375 is not permanently designated) is to ensure that the two switching circuits 120 and 320 are adapted to select the phase change elements for sensing and reference from the same region of the semiconductor chip 102, thereby minimizing or avoiding all together differences in parasitic wiring resistances. Specifically, the phase change elements 101a-d sensors can be used in a relative measurement mode (101a v. 101b, 101b v. 101c, 101c v. 101d, etc.) such that the parasitic resistances in the wiring paths to each selected pairs in the sense and reference legs 151, 152 are equal. Pairs of phase change elements that are farther away from the sense amplifier 130 would be referenced against each other and pairs of phase change elements that are closer to the sense amplifier 130 would be references against each other, as the phase change elements in such pairs will have similar parasitic resistances. During semiconductor chip formation, care should be taken to place phase change elements such that there are always pairs with equal parasitic resistances.

Figure 4:
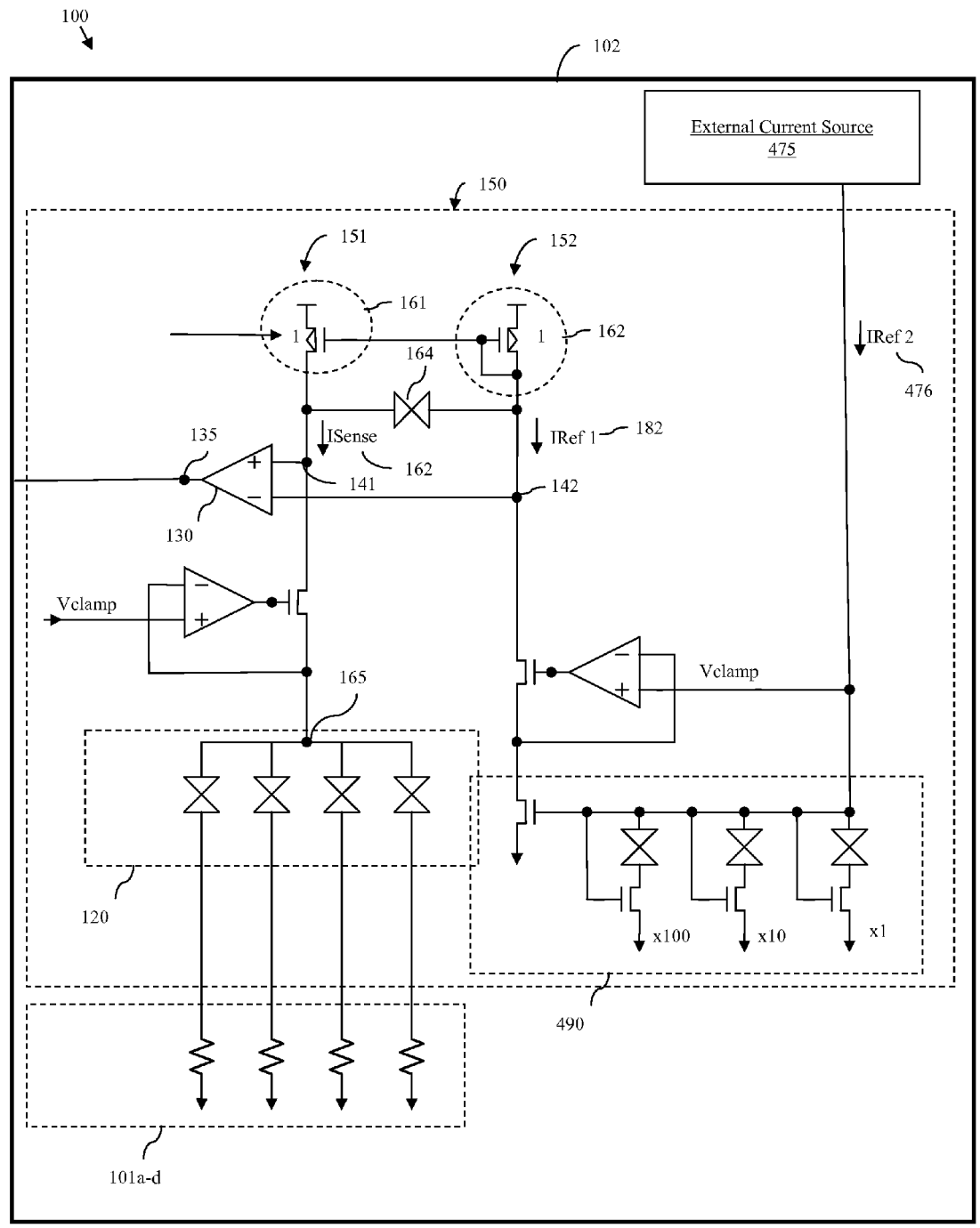
FIG. 4 is a schematic diagram illustrating another embodiment of the across-chip temperature sensing circuit of the present invention.

Referring to FIG. 4, another embodiment of an across-chip temperature sensing circuit 100 according to the present invention uses an external reference 475 as opposed to a reference phase change element. Specifically, this embodiment comprises a semiconductor chip 102 and a plurality of phase change elements 101a-d and a comparator circuit 150 on (i.e., embedded in) the semiconductor chip 102. As with the previously described embodiment, the phase change elements 101a-d can be distributed approximately evenly across the semiconductor chip 102 and can be programmed to have approximately equal amorphous resistances. Additionally, the number of the phase change elements 101a-d can be predetermined based on a predetermined minimize size of any area on the semiconductor chip 102 that could potentially have, during chip operation, a local temperature above a predetermined temperature (i.e., based on the predetermined minimum size of a potential "hot spot").

Also, as with the previously described embodiment, the comparator circuit 150 can comprise a sensing leg 151, a reference leg 152 and a voltage difference detection device 130. A first current source 161 is adapted to generate a first current 181 (i.e., a sense current (ISense)) for the sensing leg 151 and a second current source 162 is adapted to generate a second current 182 (i.e., a first reference current (IRef1)) for the reference leg 152. The current sources 161, 162 can, for example, comprise essentially identical p-type field effect transistors (i.e., p-type field effect transistors formed according to a same design). An equalizing multiplexer 164 can ensure that the first and second currents (ISense and IRef1) 181-182 are equal.

Again, as with the previously described embodiment, in the sensing leg 151, the first current source 161 can be electrically connected to at least one selected phase change element (i.e., a selected one of 101a-d) through a switching circuit 120. That is, all of the distributed phase change elements 101a-d can be electrically connected to a switching circuit 120. This switching circuit 120 can comprise a set of bit switches each electrically connected between a corresponding phase change element and a node 165. Thus, the switching circuit 120 can be configured to allow any one of the distributed phase change elements 101a-d to be selectively connected to the first current source 161 for sensing.

However, in the reference leg 152, the second current source 162 can be electrically connected to a third current source 475 (i.e., an external reference current source) adapted to generate a third current 476 (i.e., a second reference current (IRef2)) for the reference leg 152. This third current source 475 can comprise, for example, a conventional bandgap reference circuit or, alternatively, a voltage to current (VtoI) converter circuit.

Yet again, as with the previously described embodiment, the voltage difference detection device 130 can comprise, for example, a sense amplifier with two inputs 131, 132. A first input 131 can be electrically connected to a first node 141 between the first current source 161 and the selected phase change element (e.g., 101a). A second input 132 can be electrically connected to a second node 142 between the second current source 162 and the third current source 475. The voltage difference detection device 130 can adapted to compare a first voltage at the first input 131 and a second voltage at the second input 132, when the first current 181 (ISense) is applied to the sensing leg 151 and when the second and third currents 182, 476 (IRef1 and IRef2) are applied to the reference leg 152. Different voltages are again indicative of variations in local temperatures, during chip operation.

In this embodiment the third current source 475 can be directly connected to the second node 142 (not shown) so that a pre-set current 476 can supplied to the comparator circuit 150. Alternatively, the third current source 475 can be connected to the second node 142 via a current mirror circuit 490. This current mirror 490 allows for selectable gain (i.e., the value of the third current 476 (IRef2) can be multiplied, for example, by up to 100). This provides the comparator circuit 150 with greater sensing flexibility. That is, because the current value is variable, multiple selected phase change elements can be selected for simultaneous comparison against the reference or a set of references to get resistance distributions.

Figure 5:
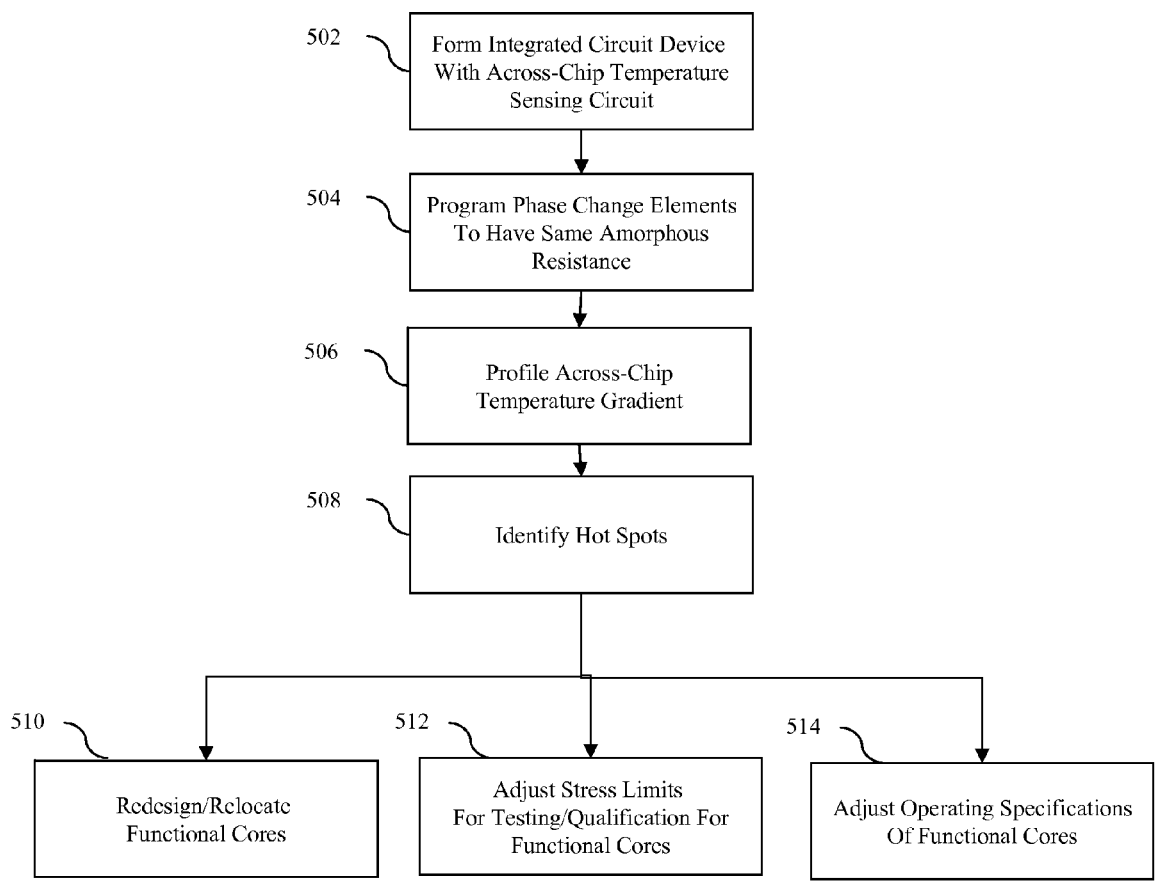
FIG. 5 is a flow diagram illustrating a method of the present invention.

Referring to FIG. 5, also disclosed herein are embodiments of an associated method of across-chip temperature profiling. Specifically, the method embodiments can comprise forming an integrated circuit device with an across-chip temperature sensing circuit 100, as described above and illustrated in FIGS. 1-4) (502). That is, a semiconductor chip 102 having a plurality of approximately evenly distributed phase change elements 101a-b is provided. Specifically, the phase change elements 101a-d can be formed to contain phase change materials. These phase change materials can, for example, comprise chalcogenides or alloys thereof, and perovskites or perovskite-like materials (e.g., colossal magnetoresistance (CMR) materials and high temperature superconductivity (HTSC) materials) or any other suitable material capable of switching between stable states with different resistances, such as an amorphous state or a crystalline state.

Next, the phase change elements 101a-d are programmed so that they have the same (i.e., approximately equal) amorphous resistances (504). Specifically, electric impulses can be applied to the phase change materials in order to "tune" or "program" them such that they exhibit a desired amorphous resistive property. In their amorphous state, these resistance switching materials exhibit a relatively higher resistance, than in their crystalline state.

Once the phase change elements are programmed at process 504, the temperature-dependent behavior exhibited by each of these phase change elements 101a-d during chip operation is sensed in order to profile the temperature gradient across the semiconductor chip (506). This sensing process can be accomplished, for example, using the above-described comparator circuit 150. Based on this cross-chip temperature gradient profile, areas on the semiconductor chip 102 having local temperatures outside a predetermined range can also be identified based on the cross-chip temperature gradient profile (i.e., hot spots are identified) (508).

Once such areas are identified, functional cores in those areas can be redesigned and/or relocated to other areas of the semiconductor chip in order to optimize SOC performance (510). More specifically, those skilled in the art will recognize that systems-on-chip (SOCs) are integrated circuits that typically incorporate multiple functional cores or macros interconnected over a common system bus. The functional cores can comprise a variety of third party intellectual property (IP) cores, logic cores, memory cores, processor cores, dust logic cores, an input/output system core, etc. The range of optimal operating conditions of the different cores may vary (e.g., some may operate sufficiently at higher temperatures, others may not). Consequently, once the across-chip temperature gradient of a chip is determined, the design and/or location of certain functional cores may be adjusted, as necessary, to ensure optimal SOC performance.

Additionally, stress limits for testing/qualification of the functional cores can be set (512). That is, if a given functional core is located in a known hot-spot, the stress limits for testing/qualification of that functional core can be adjusted in order to be certain that the functional core can operate sufficiently within the hot spot. Finally, operating specifications (e.g., operating voltages, cooling requirements, etc) of functional cores in the identified areas can be adjusted in an effort to limit across-chip temperature variations (514).

In any of the above-described embodiments, the resulting integrated circuit chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi-chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, it should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of an across-chip temperature sensing circuit and an associated method that can be used to profile the across-chip temperature gradient. The embodiments incorporate a plurality of phase change elements distributed approximately evenly across the semiconductor chip. These phase change elements are programmed to have essentially the same amorphous resistance. Temperature-dependent behavior exhibited by each of the phase change elements individually is compared to a reference (e.g., generated by a discrete reference phase change element, generated by another one of the phase change elements, or generated by an external reference) in order to profile the temperature gradient across the semiconductor chip. Once profiled, this temperature gradient can be used to redesign and/or relocate functional cores, to set stress limits for qualification of functional cores and/or to adjust operating specifications of functional cores. Another potential benefit of the above-described embodiments is that they may be used at final test to alter circuits, such as voltage controlled oscillators (VCOs) or the like, that are trimmed to adjust there performance characteristics.

What is claimed is:

1. A circuit comprising:
    a semiconductor chip;
    a plurality of phase change elements on said semiconductor chip, all of said phase change elements being programmed to an amorphous state so as to have approximately equal amorphous resistances and so as to exhibit essentially the same temperature-dependent electrical properties;
    a comparator circuit on said semiconductor chip, said comparator circuit comprising:
        a first current source generating a first current and being electrically connected to a selected phase change element through a switching circuit, said selected phase change element being located at a first location on said semiconductor chip;
        a second current source generating a second current and being electrically connected to a reference phase change element, said reference phase change element being different from said selected phase change element and being located at a second location on said chip; and
        a voltage difference detection device comprising:
            a first input electrically connected to a first node between said first current source and said selected phase change element; and
            a second input electrically connected to a second node between said second current source and said reference phase change element, said voltage difference detection device comparing a first voltage at said first input and a second voltage at said second input to detect a voltage difference between said first voltage and said second voltage, said voltage difference being indicative of a temperature difference between said first location and said second location.

2. The circuit according to claim 1, said reference phase change element comprising one of a phase change element permanently designated as said reference phase change element; and a second selected phase change element connected to said second current source through a second switching circuit.

3. The circuit according to claim 1, said comparator circuit further comprising a third current source generating a third current and being electrically connected to a third node between said first node and said switching circuit in order to adjust an initial amorphous resistance of said selected phase change element to below a predetermined level so as to compensate for non-temperature related voltage differences at said first input and said second input.

4. The circuit according to claim 3, said non-temperature related voltage differences at said first input and said second input comprising at least one of the following:
    differences in amorphous resistances between said reference phase change element and said selected phase change element, due to process variations; and
    differences in parasitic wiring resistances, due to relative distances of said reference phase change element and said selected phase change element from said voltage difference detection device.

5. The circuit according to claim 1, said reference phase change element comprising a second selected phase change element connected to said second current source through a second switching circuit and said switching circuit and said second switching circuit further selecting said selected phase change element and said second selected phase change element, respectively, from a same region of said semiconductor chip in order to avoid voltage differences at said first input node and said second input node due to differences in parasitic wiring resistances.

6. The circuit according to claim 1, said voltage difference detection device comprising a sense amplifier.

7. The circuit according to claim 1, further comprising a multiplexing equalizer ensuring that said first current and said second current are equal.

8. The circuit according to claim 1, said phase change elements being distributed approximately evenly across said semiconductor chip and the number of said phase change elements being predetermined based on a predetermined minimize size of any area on said semiconductor chip that could potentially have, during chip operation, a local temperature above a predetermined temperature.

9. A circuit comprising:
    a semiconductor chip;
    a plurality of phase change elements on said semiconductor chip;
    a comparator circuit on said semiconductor chip, said comparator circuit comprising:
        a first current source generating a first current and being electrically connected to a selected phase change element through a switching circuit;
        a second current source generating a second current and being electrically connected to a reference phase change element, said reference phase change element being different from said selected phase change element; and
        a voltage difference detection device comprising:
            a first input electrically connected to a first node between said first current source and said selected phase change element; and a second input electrically connected to a second node between said second current source and said reference phase change element, said voltage difference detection device comparing a first voltage at said first input and a second voltage at said second input; and a third current source generating a third current and being electrically connected to a third node between said first node and said switching circuit in order to adjust an initial amorphous resistance of said selected phase change element to below a predetermined level so as to compensate for non-temperature related voltage differences at said first input and said second input, said non-temperature related voltage differences at said first input and said second input comprising at least one of the following:

differences in amorphous resistances between said reference phase change element and said selected phase change element, due to process variations; and differences in parasitic wiring resistances, due to relative distances of said reference phase change element and said selected phase change element from said voltage difference detection device.

10. The circuit according to claim 9, said reference phase change element comprising one of a phase change element permanently designated as said reference phase change element; and a second selected phase change element connected to said second current source through a second switching circuit.

11. The circuit according to claim 9, said phase change elements all being programmed to have approximately equal amorphous resistances.

12. The circuit according to claim 9, said reference phase change element comprising a second selected phase change element connected to said second current source through a second switching circuit and said switching circuit and said second switching circuit further selecting said selected phase change element and said second selected phase change element, respectively, from a same region of said semiconductor chip in order to avoid voltage differences at said first input node and said second input node due to differences in parasitic wiring resistances.

13. The circuit according to claim 9, said voltage difference detection device comprising a sense amplifier.

14. The circuit according to claim 9, further comprising a multiplexing equalizer ensuring that said first current and said second current are equal.

15. The circuit according to claim 9, said phase change elements being distributed approximately evenly across said semiconductor chip and the number of said phase change elements being predetermined based on a predetermined minimize size of any area on said semiconductor chip that could potentially have, during chip operation, a local temperature above a predetermined temperature.

16. A circuit comprising:
a semiconductor chip;
a plurality phase change elements distributed approximately evenly across said semiconductor chip, said phase change elements comprising:
sensing phase change elements; and
a reference phase change element, said sensing phase change elements and said reference phase change element all being programmed to an amorphous state so as to have approximately equal amorphous resistances and so as to exhibit essentially the same temperature-dependent electrical properties; and a comparator circuit on said semiconductor chip, said comparator circuit comprising:
a first current source generating a first current;
a switching circuit selectively and individually connecting said first current source to said sensing phase change elements;
a second current source generating a second current and being connected to a reference phase change element;
a multiplexing equalizer connected to said first current source and said second current source and ensuring that said first current and said second current are equal; and
a voltage difference detection device comprising:
a first input electrically connected to a first node between said first current source and said switching circuit; and
a second input electrically connected to a second node between said second current source and said reference phase change element,
for each of said sensing phase change elements, said voltage difference detection device comparing a first voltage at said first input and a second voltage at said second input to detect a voltage difference between said first voltage and said second voltage, said voltage difference associated with a sensing phase change element being indicative of a temperature difference between a first location of said sensing phase change element and a second location of said reference phase change element such that the voltage differences associated with all of said sensing phase change elements are indicative of across-chip temperature variations.

17. The circuit according to claim 16, said reference phase change element comprising one of the following:
any selected one of said phase change elements connected to said second current source through a second switching circuit; and
a permanently designated reference phase change element.

18. The circuit according to claim 16, said comparator circuit further comprising a third current source generating a third current and being electrically connected to a third node between said first node and said switching circuit in order to adjust an initial amorphous resistance of said selected phase change element to below a predetermined level so as to compensate for non-temperature related voltage differences at said first input and said second input, said non-temperature related voltage differences at said first input and said second input comprising at least one of the following: differences in amorphous resistances between said reference phase change element and said selected phase change element, due to process variations; and differences in parasitic wiring resistances, due to relative distances of said reference phase change element and said selected phase change element from said voltage difference detection device.

19. The circuit according to claim 16, wherein a number of said phase change elements is predetermined based on a predetermined minimize size of any area on said semiconductor chip that could potentially have, during chip operation, a local temperature above a predetermined temperature.

* * * * *